US012333990B2

(12) United States Patent
Lim et al.

(10) Patent No.: US 12,333,990 B2
(45) Date of Patent: Jun. 17, 2025

(54) GATE DRIVING CIRCUITS, DISPLAY PANELS AND DISPLAY DEVICES

(71) Applicant: TCL CHINA STAR OPTOELECTRONICS TECHNOLOGY CO., LTD., Guangdong (CN)

(72) Inventors: Donghun Lim, Guangdong (CN); Zelin Yang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/523,939

(22) Filed: Nov. 30, 2023

(65) Prior Publication Data

US 2025/0124842 A1 Apr. 17, 2025

(30) Foreign Application Priority Data

Oct. 16, 2023 (CN) ......................... 202311341666.9

(51) Int. Cl.
*G09G 3/20* (2006.01)

(52) U.S. Cl.
CPC ... *G09G 3/2092* (2013.01); *G09G 2310/0267* (2013.01); *G09G 2310/0294* (2013.01); *G09G 2310/061* (2013.01)

(58) Field of Classification Search
CPC ......... G09G 3/2092; G09G 2310/0267; G09G 2310/0294; G09G 2310/061
See application file for complete search history.

(56) References Cited

U.S. PATENT DOCUMENTS

| | | | | |
|---|---|---|---|---|
| 2015/0302936 | A1* | 10/2015 | Ma | G11C 19/28 377/64 |
| 2018/0190173 | A1* | 7/2018 | Feng | G09G 3/20 |
| 2019/0355432 | A1* | 11/2019 | Su | G11C 19/28 |
| 2020/0027415 | A1* | 1/2020 | Chen | G09G 3/3677 |
| 2021/0335310 | A1* | 10/2021 | Zhu | G09G 3/3677 |
| 2021/0366336 | A1* | 11/2021 | Zhu | G09G 3/20 |

* cited by examiner

*Primary Examiner* — Sejoon Ahn
(74) *Attorney, Agent, or Firm* — PV IP PC; Wei Te Chung

(57) ABSTRACT

Gate driving circuits, display panels, and display devices are provided. The gate driving circuit includes cascaded gate driving units, each of which includes an input unit, an output unit, a reset control unit, and a pull-down holding unit. The input unit outputs a driving signal to a first node. The output unit outputs a scanning signal in response to the driving signal. The reset control unit outputs a reset control signal to a second node during a first period. The pull-down holding unit receives the reset control signal. The pull-down holding unit outputs a first voltage signal to the first node in response to the reset control signal to reset a potential of the first node during the first period, and outputs the first voltage signal to the first node to maintain the potential of the first node during a second period.

20 Claims, 5 Drawing Sheets

GATE DRIVING CIRCUITS, DISPLAY PANELS AND DISPLAY DEVICES

CROSS-REFERENCE TO RELATED APPLICATION

This application claims priority to Chinese Patent Application No. 202311341666.9, filed on Oct. 16, 2023, the disclosure of which is incorporated herein by reference in its entirety.

TECHNICAL FIELD

The present disclosure relates to the field of display technologies, and in particular, to gate driving circuits, display panels, and display devices.

BACKGROUND

Gate drive on array (GOA) technique integrates a scanning line driving circuit, i.e. a gate driving circuit, on an array substrate of a display panel to reduce product costs in terms of material costs and manufacturing processes. In related art, the stability of the gate driving circuit is poor, which may affect the display effect of the display panel.

Therefore, how to improve the stability of the gate driving circuit is a technical problem that needs to be solved.

SUMMARY

In view of above, gate driving circuits are provided according to embodiments of the present disclosure. The gate driving circuit includes a plurality of cascaded gate driving sub-circuits, and each of the gate driving sub-circuits includes: an input circuit, coupled to a first node and configured to output a driving signal to the first node; an output circuit, coupled to the first node and configured to output a scanning signal in response to the driving signal; a reset control circuit, coupled to a second node and configured to output a reset control signal to the second node in response to a control signal during a first period; and a pull-down holding circuit, coupled to the first node and the second node and configured to receive the reset control signal during the first period, configured to output a first voltage signal to the first node in response to the reset control signal to reset a potential of the first node during the first period, and configured to output the first voltage signal to the first node to maintain the potential of the first node during a second period.

Display panels are also provided according to embodiments of the present disclosure. The display panel includes the above-mentioned gate driving circuit.

Display devices are also provided according to embodiments of the present disclosure. The display device includes the above-mentioned display panel.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

Figure 1:
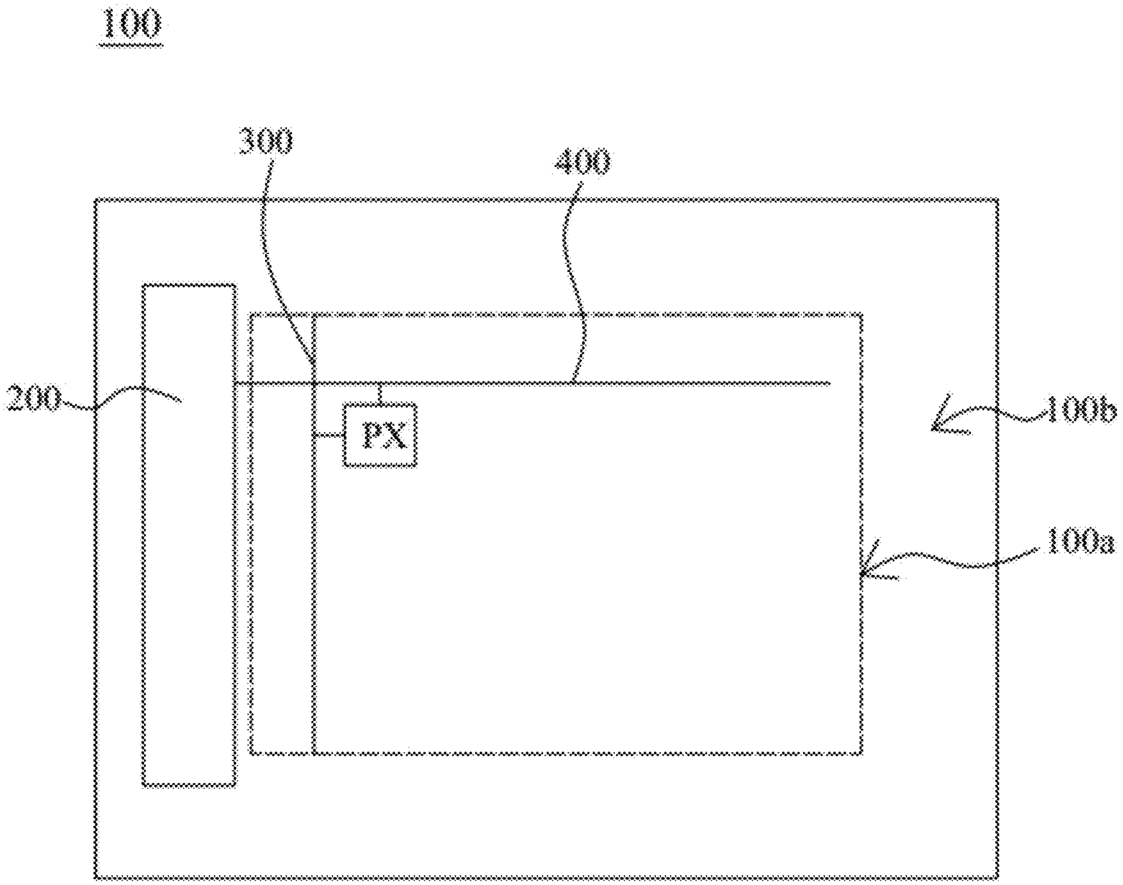
FIG. 1 is a schematic plan view of a display panel according to embodiments of the present disclosure.

Referring to FIG. 1, which is a schematic plan view of a display panel according to embodiments of the present disclosure. The display panel 100 may be any one of a liquid crystal display panel, an organic light emitting diode display panel, a sub-millimeter light emitting diode display panel, a micro light emitting diode display panel, and a quantum dot display panel. The display panel 100 includes a display area 100*a* and a non-display area 100*b* arranged around the display area 100*a*. The display panel 100 includes a plurality of scanning lines 400, a plurality of data lines 300, a plurality of display pixels PX and a gate driving circuit 200.

At least part of the plurality of scanning lines 400 and at least part of the plurality of data lines 300 are located in the display area 100*a*. The plurality of display pixels PX are located in the display area 100*a*, and each display pixel PX is coupled to one scanning line 400 and one data line 300. At least a part of the gate driving circuit 200 is located in the non-display area 100*b*, and at least another part of the gate driving circuit 200 may be located in the display area 100*a*. The gate driving circuit 200 is coupled to the plurality of scanning lines 400 and configured to output scanning signals to the plurality of scanning lines 400. The display pixel PX is configured to receive a data signal transmitted by the data line 300. The display pixels PX are configured to make the display panel 100 to display in response to the received data signals.

Figure 2:
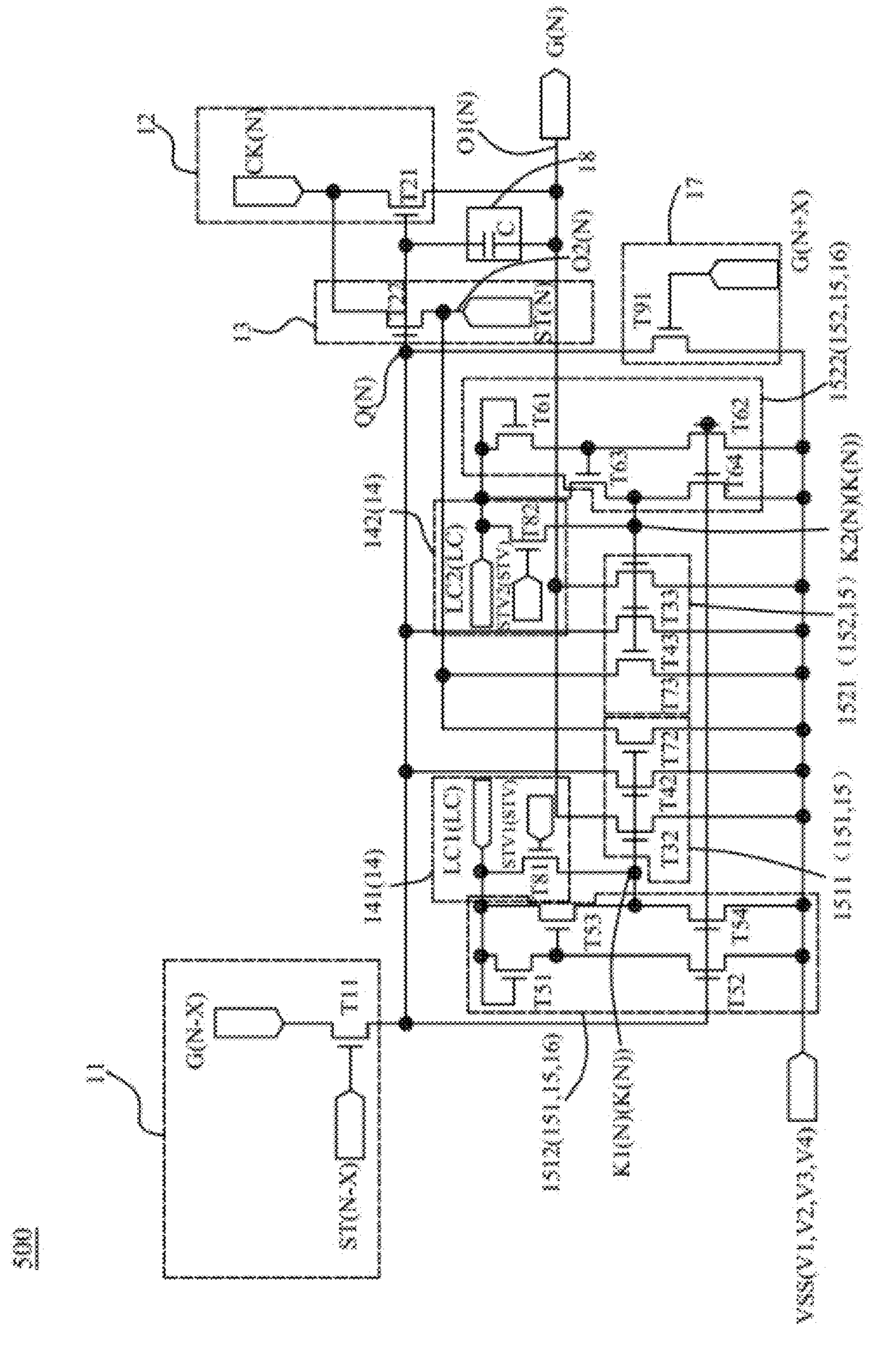
FIG. 2 is a circuit diagram of a gate driving unit of a gate driving circuit according to embodiments of the present disclosure.
Figure 3:
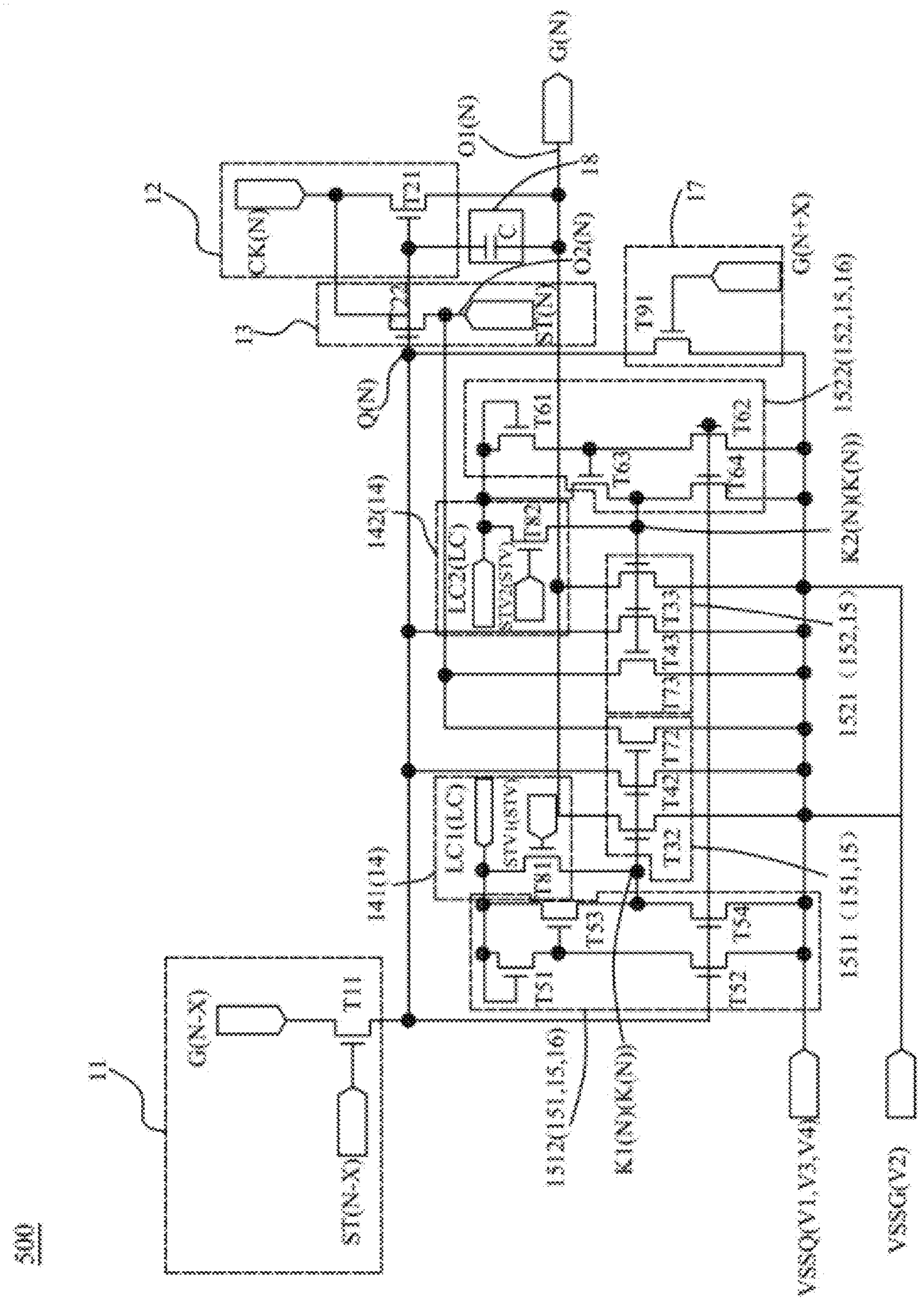
FIG. 3 is another circuit diagram of a gate driving unit of a gate driving circuit according to embodiments of the present disclosure.
Figure 4:
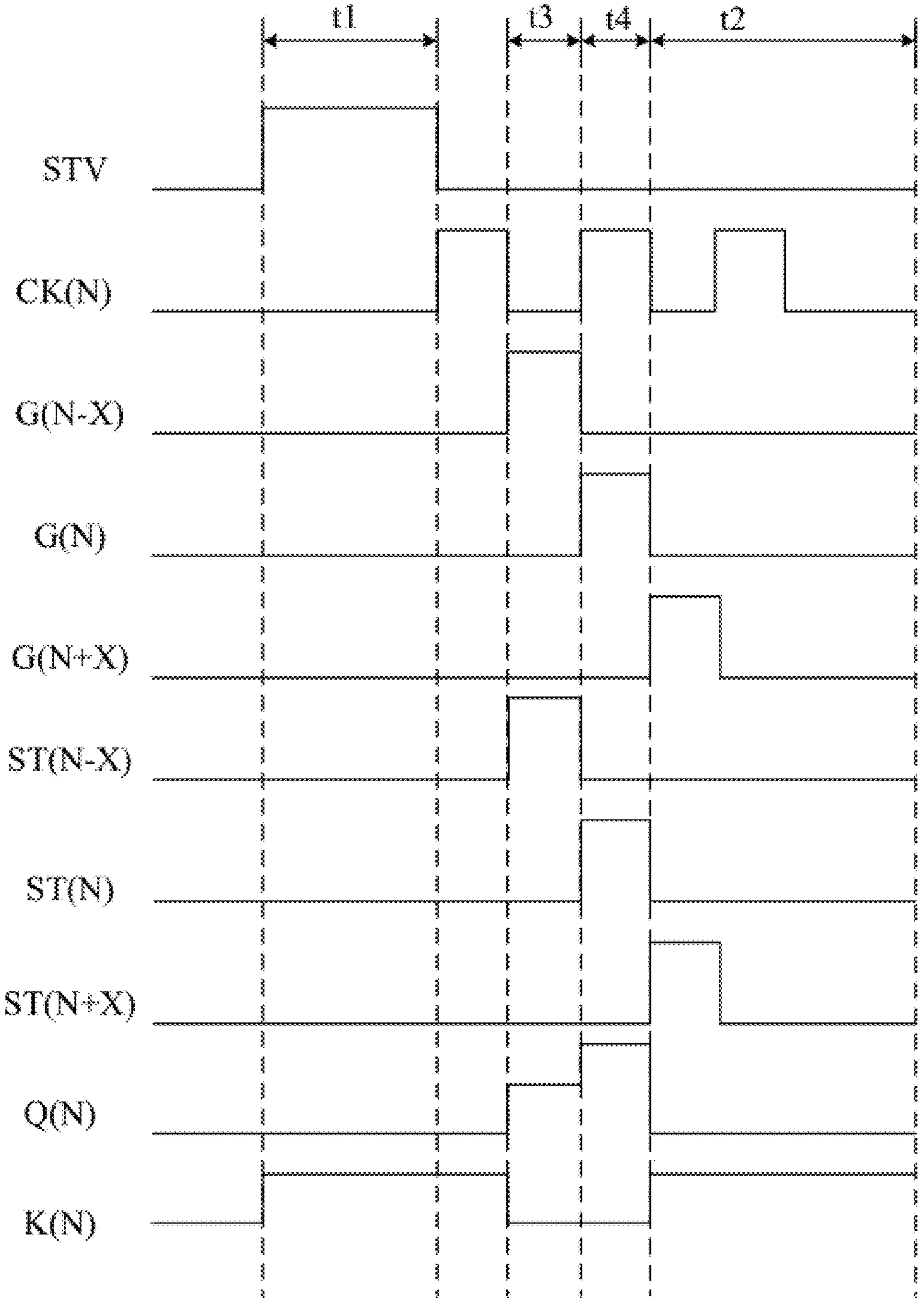
FIG. 4 is a signal timing diagram of the gate driving unit shown in FIG. 2.

Referring to FIGS. 2, 3, and 4, FIG. 2 is a circuit diagram of a gate driving unit of a gate driving circuit in embodiments of the present disclosure, FIG. 3 is another circuit diagram of a gate driving unit of a gate driving circuit according to embodiments of the present disclosure, and FIG. 4 is a signal timing diagram of the gate driving unit shown in FIG. 2.

The gate driving circuit 200 includes a plurality of cascaded gate driving units 500, and each gate driving unit 500 refers to a gate driving sub-circuit. An N-th stage gate driving unit 500 is described below, where N is an integer greater than or equal to 4. The gate driving units 500 at other levels may be deduced in the same way and will not be described again here. The gate driving unit 500 includes an input unit (i.e. an input circuit) 11, an output unit (i.e. an output circuit) 12, a reset control unit (i.e. a reset control circuit) 14, a pull-down holding unit (i.e. a pull-down holding circuit) 15, a first node Q(N), and a second node K(N).

The input unit 11 is coupled to the first node Q(N) and is configured to output a driving signal to the first node Q(N).

The output unit 12 is coupled to the first node Q(N), includes an output terminal O1(N), and is configured to output a current stage scanning signal G(N) from the output terminal O1(N) to a correspondingly coupled scanning line 400 in response to the driving signal. The first node Q(N) is a pull-up node and is located on a connection line between the input unit 11 and the output unit 12.

The reset control unit 14 is coupled to the second node K(N) and configured to output a reset control signal LC to the second node K(N) in response to a control signal STV during a first period t1.

The pull-down holding unit 15 is coupled to the first node Q(N) and the second node K(N). During the first period t1, the pull-down holding unit 15 is configured to receive the reset control signal LC and output a first voltage signal V1 to the first node Q(N) in response to the reset control signal LC to reset a potential of the first node Q(N). The pull-down holding unit 15 is also configured to output the first voltage signal V1 to the first node Q(N) during a second period t2 to maintain the potential of the first node Q(N).

In some embodiments of the present disclosure, the reset control unit 14 is coupled to the second node K(N) and configured to output the reset control signal LC to the second node K(N) in response to the control signal STV during the first period t1; the pull-down holding unit 15 is coupled to the first node Q(N) and the second node K(N); during the first period t1, the pull-down holding unit 15 is configured to receive the reset control signal LC and output the first voltage signal V1 to the first node Q(N) in response to the reset control signal LC to reset the potential of the first node Q(N); and the pull-down holding unit 15 is also configured to output the first voltage signal V1 to the first node Q(N) during the second period t2 to maintain the potential of the first node Q(N). With this design, for a key node that affects the outputting of the scanning signal output, that is, the first node Q(N), the pull-down holding unit 15 can not only maintain the potential of the first node Q(N) during the second period t2, but also reset the potential of the first node Q(N) during the first period t1.

Therefore, the pull-down holding unit 15 is multiplexed as a reset unit, i.e. a reset circuit. The reset control unit 14 and the pull-down holding unit 15 cooperate with each other to reset the potential of the first node Q(N). In this way, by resetting the potential of the first node Q(N), the residual charge at the first node Q(N) of the gate driving circuit 200 is cleared, and the stability of the gate driving circuit 200 is improved, which is beneficial to improving the display effect of the display panel 100. Furthermore, that the pull-down holding unit 15 is multiplexed as the reset unit is beneficial to simplifying a circuit structure of the gate driving circuit 200.

The pull-down holding unit 15 is also coupled to the output terminal O1(N) of the output unit 12. During the first period t1, the pull-down holding unit 15 is also configured to output a second voltage signal V2 to the output terminal O1(N) in response to the reset control signal LC to reset a potential of the output terminal O1(N). During the second period t2, the pull-down holding unit 15 is also configured to output the second voltage signal V2 to the output terminal O1(N) to maintain the potential of the output terminal O1(N). With this design, the pull-down holding unit 15 can not only maintain the potential of the output terminal O1(N) during the second period t2, but also reset the potential of the output terminal O1(N) during the first period t1. That is to say, the pull-down holding unit 15 can also be multiplexed as a reset unit, i.e. a reset circuit, for the output terminal O1(N), thereby removing the residual charge at the output terminal O1(N). The stability of the gate driving circuit 200 is further improved, which is beneficial to improving the display effect of the display panel 100.

In some embodiments, the gate driving unit 500 further includes a stage transmission unit 13. The stage transmission unit 13 refers to a stage transmission circuit is coupled to the first node Q(N). The stage transmission unit 13 includes an output terminal O2(N) and is configured to output a current stage transmission signal ST(N) from the output terminal O2(N) in response to the driving signal.

In some embodiments, the pull-down holding unit 15 is also coupled to the output terminal O2(N) of the stage transmission unit 13. During the first period t1, the pull-down holding unit 15 is also configured to output a third voltage signal V3 to the output terminal O2(N) in response to the reset control signal LC to reset a potential of the output terminal O2(N). During the second period t2, the pull-down holding unit 15 is also configured to output the third voltage signal V3 to the output terminal O2(N) to maintain the potential of the output terminal O2(N). With this design, the pull-down holding unit 15 can not only maintain the potential of the output terminal O2(N) during the second period t2, but also reset the potential of the output terminal O2(N) during the first period t1. That is to say, the pull-down holding unit 15 is also multiplexed as a reset unit, i.e. a reset circuit, for the output terminal O2(N), thereby removing the residual charge at the output terminal O2(N). The stability of the gate driving circuit 200 is further improved, which is beneficial to improving the display effect of the display panel 100.

The gate driving unit 500 further includes a pull-down unit 17, which refers to a pull-down circuit. The pull-down unit 17 is coupled to the first node Q(N) and is configured to pull down the potential of the first node Q(N) to a fourth voltage signal V4. With this arrangement, after the potential of the first node Q(N) is pulled down to the fourth voltage signal V4, the output unit 12 turns off and stops outputting the scanning signal.

The gate driving unit 500 also includes a bootstrap unit 18, which refers to a bootstrap circuit. The bootstrap unit 18 is coupled to the first node Q(N) and the output terminal O1(N), and is configured to pull up the potential of the first node Q(N) in response to a high-level current stage scanning signal G(N) output by the output terminal O1(N), thus ensuring that the output terminal O1(N) stably outputs the high-level current stage scanning signal G(N).

As shown in FIG. 4, the gate driving unit 500 operates during a first period t1, a second period t2, a third period t3, and a fourth period t4. The first period t1, the third period t3, the fourth period t4, and the second period t2 are performed in sequence. The first period t1 is a reset period, the third period t3 is a pull-up control period, the fourth period t4 is a pull-up period, and the second period t2 is a pull-down maintenance period. An operation process of the gate driving unit 500 are described below with reference to FIG. 2 and FIG. 4.

During the first period t1, the reset control unit 14 outputs the reset control signal LC to the second node K(N). The pull-down holding unit 15 receives the reset control signal LC, and then outputs the first voltage signal V1 to the first node Q(N), the second voltage signal V2 to the output terminal O1(N), and the third voltage signal V3 to the output terminal O2(N) in response to the reset control signal LC, so as to reset the potentials of the first node Q(N), the output terminal O1(N), and the output terminal O2(N). In this way, during the first period t1, the residual charges at the first node Q(N), the output terminal O1(N), and the output terminal O2(N) are cleared, thereby improving the stability of the gate driving unit 500.

Then, during the third period t3, the input unit 11 outputs the driving signal to the first node Q(N) to pull up the potential of the first node Q(N) to a first high potential.

Then, during the fourth period t4, the output unit 12 outputs the current stage scanning signal G(N) to the output terminal O1(N) in response to the driving signal, and the bootstrap unit 18 pulls up the potential of the first node Q(N) from the first high potential to a second high potential, and the second high potential is greater than the first high potential. In this way, under an action of the second high potential of the first node Q(N), the output terminal O1(N) may stably output the high-level current stage scanning signal G(N).

Then, after the fourth period t4 ends and before the second period t2 starts, the pull-down unit 17 pulls down the potential of the first node Q(N) to the fourth voltage signal V4. With this arrangement, when the first node Q(N) is at a potential corresponding to the fourth voltage signal V4, the output unit 12 stops outputting the scanning signal.

Finally, during the second period t2, the pull-down holding unit 15 outputs the first voltage signal V1 to the first node Q(N), outputs the second voltage signal V2 to the output terminal O1(N), and outputs the third voltage signal V3 to the output terminal O2(N), so as to respectively maintain the potentials of the first node Q(N), the output terminal O1(N), and the output terminal O2(N) at low levels. In this way, it is ensured that the output unit 12 stops outputting the scanning signal, and the potentials of the output terminal O1(N) and the output terminal O2(N) are maintained at low potentials.

Therefore, in the above-mentioned gate driving circuit 200, the pull-down holding unit 15 is matched with the reset control unit 14, and the pull-down holding unit 15 is multiplexed as the reset unit during the first period t1, so that the potentials of the first node Q, the output terminal O1(N), and the output terminal O2(N) may be simultaneously reset to clear the residual charges at these three key nodes, thereby greatly improving the stability of the gate driving circuit, which is beneficial to improve the display effect of the display panel. The pull-down holding unit 15 may also maintain the potentials of the first node Q(N), the output terminal O1(N), and the output terminal O2(N) during the second period t2. With this arrangement, compared with the related art, a number of transistors used for reset in the gate driving circuit 200 may be reduced, which simplifies the circuit structure of the gate driving circuit 200.

A specific composition of the gate driving unit of the gate driving circuit will be described in detail below with reference to FIG. 2 and FIG. 3, but is not limited thereto.

In some embodiments, the reset control unit 14 includes a first reset control unit 141 (i.e. a first reset control circuit) and a second reset control unit 142 (i.e. a second reset control circuit). The first reset control unit 141 and the second reset control unit 142 operate alternately according to a preset cycle to extend the operation life of the first reset control unit 141 and the second reset control unit 142. In this way, the operation life of the gate driving circuit 200 is also extended.

The control signal STV includes a first control signal STV1 and a second control signal STV2. The reset control signal LC includes a first reset control signal LC1 and a second reset control signal LC2. The second node K includes a first sub-node K1(N) and a second sub-node K2(N).

The first reset control unit 141 includes a first transistor T81. A gate of the first transistor T81 is configured to receive the first control signal STV1, one of a source and a drain of the first transistor T81 is configured to receive the first reset control signal LC1, and the other one of the source and the drain of the first transistor T81 is coupled to the first sub-node K1(N).

The second reset control unit 142 includes a first transistor T82. A gate of the first transistor T82 is configured to receive the second control signal STV2, one of a source and a drain of the first transistor T82 is configured to receive the second reset control signal LC2, and the other one of the source and the drain of the first transistor T82 is coupled to the second sub-node K2(N).

The first control signal STV1 is the same as the second control signal STV2 to simplify the wirings of the gate driving circuit 200 and reduce a space area occupied by the gate driving circuit 200 in the non-display area 100*b* of the display panel 100. Optionally, the first control signal STV1 and the second control signal STV2 may both be a start signal or a reset signal, but are not limited thereto. For example, the first control signal STV1 and the second control signal STV2 may both be start signals.

The first reset control signal LC1 and the second reset control signal LC2 have opposite phases. The first reset control signal LC1 and the second reset control signal LC2 may both be constant voltage signals. The first reset control signal LC1 and the second reset control signal LC2 change periodically. In this way, the first reset control unit 141 and the second reset control unit 14 operate alternately periodically.

For example, taking 100 frames as an alternation cycle, from the 1 st frame to the 100th frame, the first reset control signal LC1 is a high-level signal, and the second reset control signal LC2 is a low-level signal; and from the 101st frame to the 200th frame, the first reset control signal LC1 is a low-level signal, and the second reset control signal LC2 is a high-level signal.

In some embodiments, the pull-down holding unit 15 includes a first pull-down holding unit (i.e. a first pull-down holding circuit) 151 and a second pull-down holding unit (i.e. a second pull-down holding circuit) 152. The first pull-down holding unit 151 is coupled to the first node Q(N) and the first sub-node K1(N), so that the first pull-down holding unit 151 is coupled to the first reset control unit 141. The second pull-down holding unit 152 is coupled to the first node Q(N) and the second sub-node K2(N), so that the second pull-down holding unit 152 is coupled to the second reset control unit 142. The first pull-down holding unit 151 and the second pull-down holding unit 152 also operate alternately in the preset cycle to extend the operation life of the first pull-down holding unit 151 and the second pull-down holding unit 152.

The first pull-down holding unit 151 includes a first pull-down holding sub-unit 1511, which includes a second transistor T42, a third transistor T32, and a fourth transistor T72.

A gate of the second transistor T42 is coupled to the first sub-node K1(N), one of a source and a drain of the second transistor T42 is configured to receive the first voltage signal V1, and the other one of the source and the drain of the second transistor T42 is coupled to the first node Q(N). With this arrangement, when a potential of the first sub-node K1(N) is controlled respectively during the first period t1 and during the second period t2 to turn on the second transistor T42, the potential of the first node Q(N) may be reset during the first period t1 to clear the residual charge and may be maintained at a low level during the second period t2.

A gate of the third transistor T32 is coupled to the first sub-node K1(N), one of a source and a drain of the third transistor T32 is configured to receive the second voltage signal V2, and the other one of the source and the drain of the third transistor T32 is coupled to the output terminal O1(N). With this arrangement, when the potential of the first sub-node K1(N) is controlled respectively during the first period t1 and during the second period t2 to turn on the third transistor T32, the potential of the output terminal O1(N) may be reset during the first period t1 to clear the residual charge and may be maintained at a low level during the second period t2.

A gate of the fourth transistor T72 is coupled to the first sub-node K1(N), one of a source and a drain of the fourth transistor T72 is configured to receive the third voltage signal V3, and the other one of the source and the drain of the fourth transistor T72 is coupled to the output terminal O2(N). With this arrangement, when the potential of the first sub-node K1(N) is controlled respectively during the first period t1 and during the second period t2 to turn on the fourth transistor T72, the potential of the output terminal O2(N) may be reset during the first period t1 to clear the residual charge and may be maintained at a low level during the second period t2.

In some embodiments, as shown in FIG. 2, the first voltage signal V1, the second voltage signal V2, and the third voltage signal V3 are the same, and are all low-level signals VSS, but are not limited thereto.

In some embodiments, as shown in FIG. 3, the first voltage signal V1 and the third voltage signal V3 are the same, for example, both are first low-level signals VSSQ. The second voltage signal V2 is different from the first voltage signal V1, for example, the second voltage signal V2 is a second low-level signal VSSG.

It can be seen that during the first period t1, the second transistor T42, the third transistor T32, and the fourth transistor T72 all turn on under the control of the first reset control signal LC1 received by the first sub-node K1(N). When the potential of the first sub-node K1(N) causes the second transistor T42, the third transistor T32, and the fourth transistor T72 to all turn on, the residual charges at the first node Q(N), the output terminal O1(N), and the output terminal O2(N) may be simultaneously cleared. During the second period t2, when the potential of the first sub-node K1(N) causes the second transistor T42, the third transistor T32, and the fourth transistor T72 to all turn on, the potentials of the first node Q(N), the output terminal O1(N), and the output terminal O2(N) are all maintained at low levels.

The second pull-down holding unit 152 includes a second pull-down holding sub-unit 1521, which includes a second transistor T43, a third transistor T33, and a fourth transistor T73.

A gate of the second transistor T43 is coupled to the second sub-node K2(N), one of a source and a drain of the second transistor T43 is configured to receive the first voltage signal V1, and the other one of the source and the drain of the second transistor T43 is coupled to the first node Q(N). With this arrangement, when a potential of the second sub-node K2(N) is controlled respectively during the first period t1 and during the second period t2 to turn on the second transistor T43, the potential of the first node Q(N) may be reset during the first period t1 to clear the residual charge and may be maintained at a low level during the second period t2.

A gate of the third transistor T33 is coupled to the second sub-node K2(N), one of a source and a drain of the third transistor T33 is configured to receive the second voltage signal V2, and the other one of the source and the drain of the third transistor T33 is coupled to the output terminal O1(N). With this arrangement, when the potential of the second sub-node K2(N) is controlled respectively during the first period t1 and during the second period t2 to turn on the third transistor T33, the potential of the output terminal O1(N) may be reset during the first period t1 to clear the residual charge and may be maintained at a low level during the second period t2.

A gate of the fourth transistor T73 is coupled to the second sub-node K2(N), one of a source and a drain of the fourth transistor T73 is configured to receive the third voltage signal V3, and the other one of the source and the drain of the fourth transistor T73 is coupled to the output terminal O2(N). With this arrangement, when the potential of the second sub-node K2(N) is controlled respectively during the first period t1 and during the second period t2 to turn on the fourth transistor T73, the potential of the output terminal O2(N) may be reset during the first period t1 to clear the residual charge and may be maintained at a low level during the second period t2.

It can be seen that during the first period t1, the second transistor T43, the third transistor T33, and the fourth transistor T73 all turn on under the control of the second reset control signal LC2 received by the second sub-node K2(N). When the potential of the second sub-node K2(N) causes the second transistor T43, the third transistor T33, and the fourth transistor T73 to all turn on, the residual charges at the first node Q(N), the output terminal O1(N), and the output terminal O2(N) may be simultaneously cleared. During the second period t2, when the potential of the second sub-node K2(N) causes the second transistor T43, the third transistor T33, and the fourth transistor T73 to all turn on, the potentials of the first node Q(N), the output terminal O1(N), and the output terminal O2(N) are all maintained at low levels.

In some embodiments, the input unit 11 includes a fifth transistor T11. A gate of the fifth transistor T11 is configured to receive a first input signal ST(N−X), one of a source and a drain of the fifth transistor T11 is configured to receive a second input signal G(N−X), and the other one of the source and the drain of the fifth transistor T11 is coupled to the first node Q(N).

In some embodiments, the first input signal ST(N−X) includes but is not limited to a previous stage transmission signal, and the second input signal G(N−X) includes but is not limited to the previous stage scanning signal. X may be 2n, and n is an integer greater than or equal to 1. For example, n is 2, and X is 4, but is not limited thereto.

In some embodiments, the output unit 12 includes a sixth transistor T21. A gate of the sixth transistor T21 is coupled to the first node Q(N), one of a source and a drain of the sixth transistor T21 is configured to receive a clock signal CK(N), and the other one of the source and the drain of the sixth transistor T21 is coupled to the output terminal O1(N) of the output unit 12.

In some embodiments, the stage transmission unit 13 includes a seventh transistor T22. A gate of the seventh transistor T22 is coupled to the first node Q(N), one of a source and a drain of the seventh transistor T22 is configured to receive the clock signal CK(N), and the other one of the source and the drain of the seventh transistor T22 is coupled to the output terminal O2(N) of the stage transmission unit 13.

In some embodiments, the bootstrap unit 18 includes a capacitor C. One plate of the capacitor C is coupled to the first node Q(N), and the other plate of the capacitor C is coupled to the output terminal O1(N) of the output unit 12.

The pull-down holding unit 15 also includes an inverter 16. The inverter 16 is coupled to the first node Q(N) and the second node K(N), and is configured to adjust the potential of the second node K(N) according to the potential of the first node Q(N), so that the potential of the first node Q(N) is one of a high potential and a low potential, and the potential of the second node K(N) is the other one of the high potential and the low potential. The inverter 16 includes a first inverter 1512 and a second inverter 1522.

In some embodiments, the first pull-down holding unit 151 further includes the first inverter 1512. The first inverter 1512 is coupled to the first node Q(N) and the first sub-node K1(N), so that the first inverter 1512 and the first pull-down holding sub-unit 1511 are connected. The second pull-down holding unit 152 includes the second inverter 1522. The second inverter 1522 is coupled to the first node Q(N) and the second sub-node K2(N), so that the second inverter 1522 is coupled to the second pull-down holding sub-unit 1521.

The first inverter 1512 includes an eighth transistor T51, a ninth transistor T52, a tenth transistor T53, and an eleventh transistor T54.

A gate of the eighth transistor T51 is configured to receive the first reset control signal LC1, one of a source and a drain of the eighth transistor T51 is coupled to the gate of the eighth transistor T51, and the other one of the source and the drain of the eighth transistor T51 is coupled to a gate of the tenth transistor T53.

A gate of the ninth transistor T52 is coupled to the first node Q(N), one of a source and a drain of the ninth transistor T52 is coupled to the other one of the source and the drain of the eighth transistor T51, the other one of the source and the drain of the ninth transistor T52 is configured to receive the first voltage signal V1.

The gate of the tenth transistor T53 is coupled to the other one of the source and the drain of the eighth transistor T51 and is coupled to the one of the source and the drain of the ninth transistor T52, one of a source and a drain of the tenth transistor T53 is coupled to the gate of the eighth transistor T51, and the other one of the source and the drain of the tenth transistor T53 is coupled to the first sub-node K1(N).

A gate of the eleventh transistor T54 is coupled to the first node Q(N), one of a source and a drain of the eleventh transistor T54 is coupled to the other one of the source and the drain of the tenth transistor T53 and is coupled to the first sub-node K1(N), the other one of the source and the drain of the eleventh transistor T54 is configured to receive the first voltage signal V1.

The second inverter 1522 includes an eighth transistor T61, a ninth transistor T62, a tenth transistor T63, and an eleventh transistor T64. Coupling relationships between the eighth transistor T61, the ninth transistor T62, the tenth transistor T63, and the eleventh transistor T64 may be referred to FIG. 2 and FIG. 3, and will not be described again here.

The pull-down unit 17 includes a twelfth transistor T91. A gate of the twelfth transistor T91 is configured to receive a third input signal G(N+X), and one of a source and a drain of the twelfth transistor T91 is configured to receive a fourth voltage signal V4. The fourth voltage signal V4 may be a low-level signal VSS, but is not limited thereto. The third input signal G(N+X) may be a next stage scanning signal.

In some embodiments, the plurality of transistors in the gate driving circuit 200 may all be n-type transistors, but are not limited thereto. It can be understood that the transistors in the gate driving circuit 200 may also all be p-type transistors. The plurality of transistors in the gate driving circuit 200 may include n-type transistors and p-type transistors at the same time. The plurality of transistors in the gate driving circuit 200 may be selected from one or more of amorphous silicon transistors, low temperature polysilicon transistors, metal oxide transistors, and single crystal silicon transistors.

In combination with the specific circuit shown in FIG. 2 and the signal timing diagram shown in FIG. 4, that the first reset control signal LC1 is a high level signal and the second reset control signal LC2 is a low level signal is taken as an example to describe an operation process of the gate driving unit 500.

During the first period t1, the first transistor T81 turns on under an action of the high-level first control signal STV1 (also the control signal STV), and outputs the high-level first reset control signal LC1 to the first sub-node K1(N). The second transistor T42, the third transistor T32, and the fourth transistor T72 all turn on under an action of the high-level first reset control signal LC1, and output the low-level signal VSS to the first node Q(N), the output terminal O1(N), and the output terminal O2(N). In this way, the residual charges at the first node Q(N), the output terminal O1(N), and the output terminal O2(N) are all cleared.

Then, during the third period t3, the fifth transistor T11 turns on in response to the high-level first input signal ST(N−X), and the high-level second input signal G(N−X) is output to the first node Q(N) as a driving signal to pull up the potential of the first node Q(N) to the first high potential.

Then, during the fourth period t4, the sixth transistor T21 and the seventh transistor T22 turn on in response to the high-level second input signal G(N−X) output by the fifth transistor T11. When the clock signal CK(N) is high level, the sixth transistor T21 outputs the high-level clock signal CK(N) to the output terminal O1(N) as the high-level current stage scanning signal G(N), and the capacitor C pulls up the potential of the first node Q(N) from the first high potential to the second high potential. At the same time, the seventh transistor T22 outputs the high-level clock signal CK(N) to the output terminal O2(N) as the high-level current stage transmission signal ST(N). Next, when the clock signal CK(N) is low level, the sixth transistor T21 outputs the low-level clock signal CK(N) as the low-level current stage scanning signal G(N), and the seventh transistor T21 outputs the low-level clock signal CK(N) as the low-level current stage transmission signal ST(N).

Then, after the fourth period t4, the twelfth transistor T91 turns on under an action of the high-level third input signal G(N+X), and outputs the low-level signal VSS to the first node Q(N). In this way, the potential of the first node Q(N) is low, and both the sixth transistor T21 and the seventh transistor T22 turn off.

Finally, when the potential of the first node Q(N) is low, during the second period t2, both the ninth transistor T52 and the eleventh transistor T54 turn off, and the eighth transistor T51 turns on under an action of the high-level first reset control signal LC1. The tenth transistor T53 also turns on in response to the first reset control signal LC1 output by the eighth transistor T51 and outputs the high-level first reset control signal LC1 to the second sub-node K1(N). The second transistor T42, the third transistor T32, and the fourth transistor T72 turn on under the action of the high-level first reset control signal LC1, and output the low-level signal VSS to the first node Q(N), the output terminal O1(N), and the output terminal O2(N). In this way, the potentials of the first node Q(N), the output terminal O1(N), and the output terminal O2(N) are maintained at low potentials corresponding to the low level signal VSS.

Figure 5:
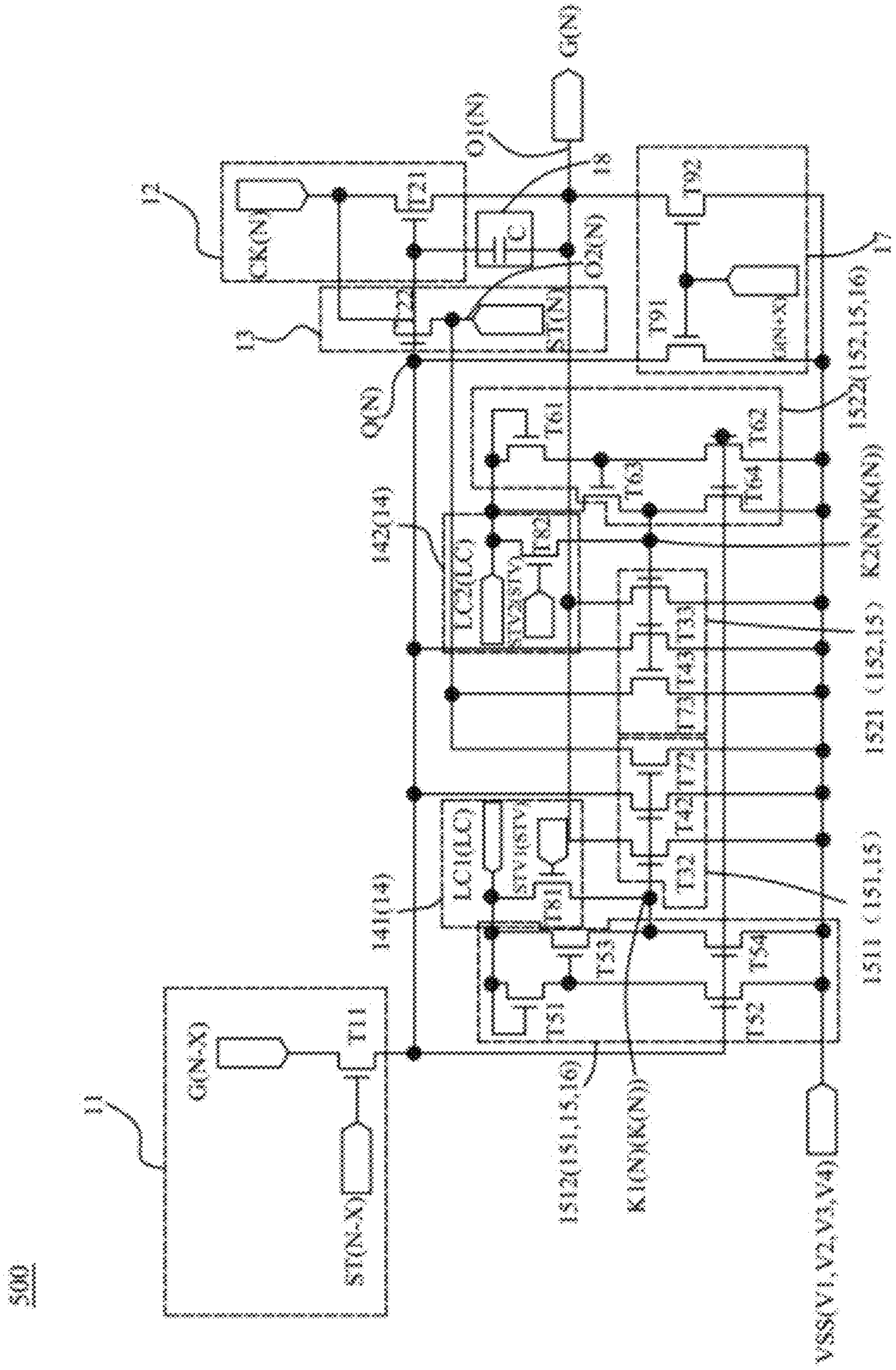
FIG. 5 is another circuit diagram of a gate driving unit of a gate driving circuit according to embodiments of the present disclosure.

Referring to FIG. 5, which is a circuit diagram of a gate driving unit of a gate driving circuit according to embodiments of the present disclosure. The gate driving unit shown in FIG. 5 is basically similar to the gate driving unit shown in FIG. 2, except that the pull-down unit 17 shown in FIG. 5 may also include a thirteenth transistor T92. A gate of the thirteenth transistor T92 is configured to receive the third input signal G(N+X), one of a source and a drain of the thirteenth transistor T92 is configured to receive the first voltage signal V1, and the other one of the source and the drain of the thirteenth transistor T92 is coupled to the output terminal O1(N).

An operation mode of the gate driving unit shown in FIG. 5 is basically similar to the operation mode of the gate driving unit shown in FIG. 2, and the similarities will not be repeated. The differences include that after the fourth period t4, the thirteenth transistor T92 turns on under the action of the high-level third input signal G(N+X), and outputs the first voltage signal V1 as the low-level current stage scanning signal G(N).

Based on the same inventive concept, the present disclosure also provides display devices. The display device includes the display panel of any one of the above embodiments. The display device may be any one of a liquid crystal display device, an organic light emitting diode display device, a quantum dot display device, a micro light emitting diode display device, and a sub-millimeter light emitting diode display device.

The description of the above embodiments is only configured to help understand the technical solution and core idea of the present disclosure. Those of ordinary skill in the art should understand: it is still possible to modify the technical solutions recorded in the foregoing embodiments, or to equivalently replace some of the technical features, and these modifications or substitutions do not cause the essence of the corresponding technical solutions to depart from the scope of the technical solutions of the embodiments of the present disclosure.

What is claimed is:

1. A gate driving circuit, comprising a plurality of cascaded gate driving sub-circuits, and each of the gate driving sub-circuits comprising:

an input circuit coupled to a first node and configured to output a driving signal to the first node;

an output circuit coupled to the first node and configured to output a scanning signal in response to the driving signal;

a reset control circuit coupled to a second node and configured to output a reset control signal to the second node in response to a control signal during a first period; and a pull-down holding circuit coupled to the first node and the second node and configured to receive the reset control signal during the first period, configured to output a first voltage signal to the first node in response to the reset control signal to reset a potential of the first node to a potential corresponding to the first voltage signal during the first period, and configured to output the first voltage signal to the first node to maintain the potential of the first node to the potential corresponding to the first voltage signal during a second period, wherein the reset control circuit comprises a first transistor, a gate of the first transistor is configured to receive the control signal, one of a source and a drain of the first transistor is configured to receive the reset control signal, and the other one of the source and the drain of the first transistor is coupled to the second node.

2. The gate driving circuit according to claim 1, wherein the pull-down holding circuit comprises a second transistor, a gate of the second transistor is coupled to the second node, one of a source and a drain of the second transistor is configured to receive the first voltage signal, and the other one of the source and the drain of the second transistor is coupled to the first node.

3. The gate driving circuit according to claim 1, wherein the output circuit comprises an output terminal, the pull-down holding circuit is coupled to the output terminal of the output circuit:

during the first period, the pull-down holding circuit is configured to output a second voltage signal to the output terminal of the output circuit in response to the reset control signal to reset a potential of the output terminal of the output circuit; and during the second period, the pull-down holding circuit is configured to output the second voltage signal to the output terminal of the output circuit to maintain the potential of the output terminal of the output circuit.

4. The gate driving circuit according to claim 3, wherein the pull-down holding circuit comprises a third transistor, a gate of the third transistor is coupled to the second node, one of a source and a drain of the third transistor is configured to receive the second voltage signal, and the other one of the source and the drain of the third transistor is coupled to the output terminal of the output circuit.

5. The gate driving circuit according to claim 3, wherein each of the gate driving sub-circuit further comprises a bootstrap circuit, coupled to the first node and the output terminal of the output circuit, and is configured to pull up the potential of the first node in response to a high-level current stage scanning signal output by the output terminal of the output circuit.

6. The gate driving circuit according to claim 1, wherein each of the gate driving sub-circuits further comprises:

a stage transmission circuit, coupled to the first node, comprising an output terminal, and configured to output a current stage transmission signal in response to the driving signal, wherein the pull-down holding circuit is also coupled to the output terminal of the stage transmission circuit;

during the first period, the pull-down holding circuit is configured to output a third voltage signal to the output terminal of the stage transmission circuit in response to the reset control signal to reset a potential of the output terminal of the stage transmission circuit; and during the second period, the pull-down holding circuit is configured to output the third voltage signal to the output terminal of the stage transmission circuit to maintain the potential of the output terminal of the stage transmission circuit.

7. The gate driving circuit according to claim 6, wherein the pull-down holding circuit further comprises a fourth transistor, a gate of the fourth transistor is coupled to the second node, one of a source and a drain of the fourth transistor is configured to receive the third voltage signal, and the other one of the source and the drain of the fourth transistor is coupled to the output terminal of the stage transmission circuit.

8. The gate driving circuit according to claim 6, wherein the stage transmission circuit comprises a seventh transistor, a gate of the seventh transistor is coupled to the first node, one of a source and a drain of the seventh transistor is configured to receive a clock signal, and the other one of the source and the drain of the seventh transistor is coupled to the output terminal of the stage transmission unit.

9. The gate driving circuit according to claim 1, wherein the input circuit comprises a fifth transistor, a gate of the fifth transistor is configured to receive a first input signal, one of a source and a drain of the fifth transistor is configured to receive a second input signal, and the other one of the source and the drain of the fifth transistor is coupled to the first node.

10. The gate driving circuit according to claim 1, wherein the output circuit comprises a sixth transistor, a gate of the sixth transistor is coupled to the first node, one of a source and a drain of the sixth transistor is configured to receive a clock signal, and the other one of the source and the drain of the sixth transistor is coupled to an output terminal of the output circuit.

11. The gate driving circuit according to claim 1, wherein the pull-down holding circuit further comprises:

an inverter, coupled to the first node and the second node, and configured to adjust a potential of the second node according to the potential of the first node.

12. The gate driving circuit according to claim 11, wherein the inverter comprises an eighth transistor, a ninth transistor, a tenth transistor, and an eleventh transistor;

a gate of the eighth transistor is configured to receive the reset control signal, one of a source and a drain of the eighth transistor is coupled to the gate of the eighth transistor, and the other one of the source and the drain of the eighth transistor is coupled to a gate of the tenth transistor;

a gate of the ninth transistor is coupled to the first node, one of a source and a drain of the ninth transistor is coupled to the other one of the source and the drain of the eighth transistor, and the other one of the source and the drain of the ninth transistor is configured to receive the first voltage signal;

one of a source and a drain of the tenth transistor is coupled to the gate of the eighth transistor, and the other one of the source and the drain of the tenth transistor is coupled to the second node; and a gate of the eleventh transistor is coupled to the first node, one of a source and a drain of the eleventh transistor is coupled to the other one of the source and the drain of the tenth transistor and is coupled to the second node, and the other one of the source and the drain of the eleventh transistor is configured to receive the first voltage signal.

13. The gate driving circuit according to claim 1, wherein each of the gate driving sub-circuit further comprises a pull-down circuit, which is coupled to the first node and is configured to pull down the potential of the first node to a fourth voltage signal.

14. The gate driving circuit according to claim 13, wherein the pull-down circuit comprises a twelfth transistor, a gate of the twelfth transistor is configured to receive a third input signal, and one of a source and a drain of the twelfth transistor is configured to receive a fourth voltage signal.

15. The gate driving circuit according to claim 14, wherein the pull-down circuit further comprises a thirteenth transistor, a gate of the thirteenth transistor is configured to receive the third input signal, one of a source and a drain of the thirteenth transistor is configured to receive the first voltage signal, and the other one of the source and the drain of the thirteenth transistor is coupled to an output terminal of the output circuit.

16. The gate driving circuit according to claim 1, wherein the control signal is a start signal or a reset signal.

17. The gate driving circuit according to claim 1, wherein the reset control circuit comprises a first reset control circuit and a second reset control circuit, the second node comprises a first sub-node and a second sub-node, and the pull-down holding circuit comprises a first pull-down holding circuit and a second pull-down holding circuit;

the first pull-down holding circuit is coupled to the first node and the first sub-node, so as to be coupled to the first reset control circuit, and the second pull-down holding circuit is coupled to the first node and the second sub-node, so as to be coupled to the second reset control circuit; and the control signal comprises a first control signal and a second control signal, the first reset control circuit is configured to output a first reset control signal to the first sub-node in response to the first control signal during the first period, the second reset control circuit is configured to output a second reset control signal to the second sub-node in response to the second control signal during the first period, and the first reset control circuit and the second reset control circuit operate alternately according to a preset cycle.

18. A display panel, comprising the gate driving circuit of claim 1.

19. A display device, comprising a display panel, and the display panel comprising the gate driving circuit of claim 1.

20. A gate driving circuit, comprising a plurality of cascaded gate driving sub-circuits, and each of the gate driving sub-circuits comprising:

an input circuit coupled to a first node and configured to output a driving signal to the first node;

an output circuit coupled to the first node and configured to output a scanning signal in response to the driving signal;

a reset control circuit coupled to a second node and configured to output a reset control signal to the second node in response to a control signal during a first period; and a pull-down holding circuit coupled to the first node and the second node and configured to receive the reset control signal during the first period, configured to output a first voltage signal to the first node in response to the reset control signal to reset a potential of the first node to a potential corresponding to the first voltage signal during the first period, and configured to output the first voltage signal to the first node to maintain the potential of the first node to the potential corresponding to the first voltage signal during a second period, wherein the pull-down holding circuit comprises a second transistor, a gate of the second transistor is coupled to the second node, one of a source and a drain of the second transistor is configured to receive the first voltage signal, and the other one of the source and the drain of the second transistor is coupled to the first node.

* * * * *